3,281,767
METHOD AND APPARATUS FOR CONTINUOUS MARINE SEISMIC SURVEYING

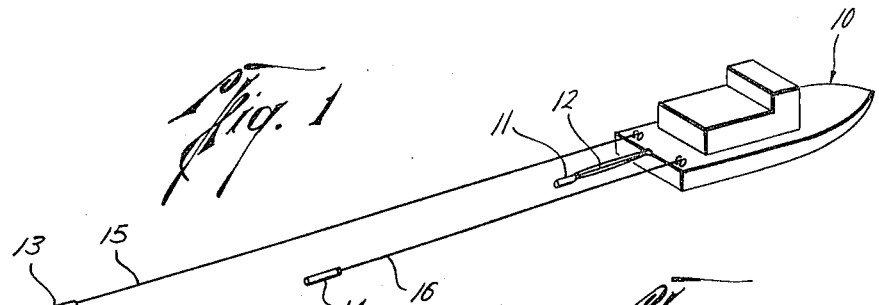
Fig. 1
Fig. 2
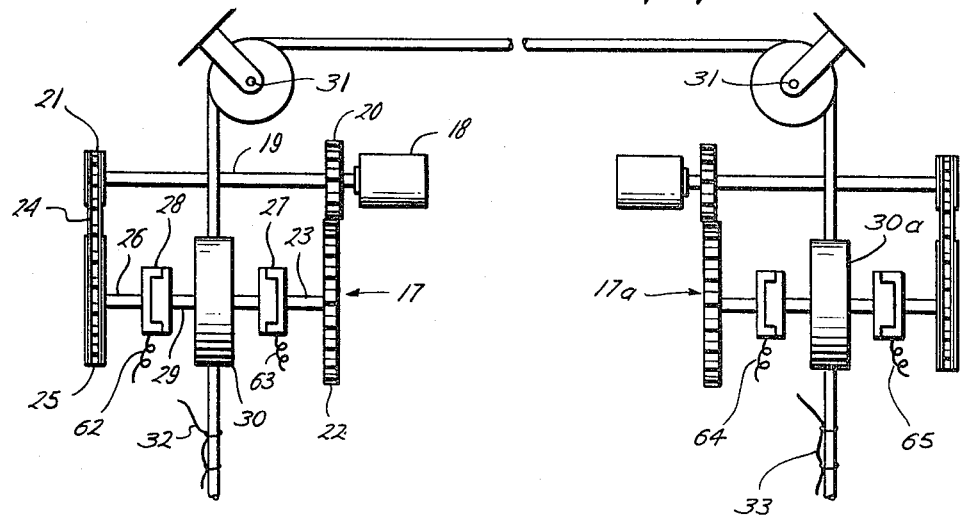
Fig. 3
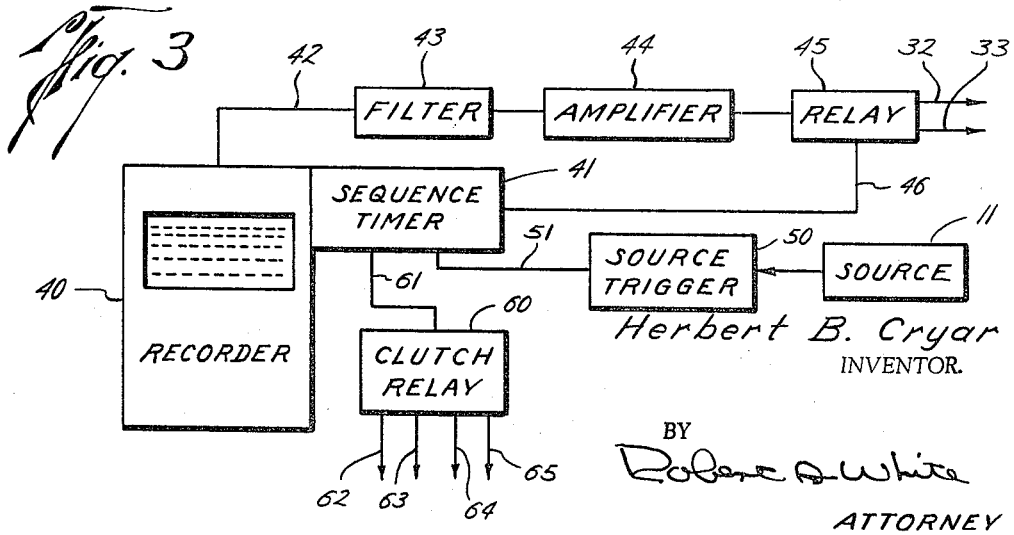
Herbert B. Cryar
INVENTOR.
BY Robert A. White
ATTORNEY

Herbert B. Cryar, Dickinson, Tex., assignor to Marine Geophysical Services Corp., Houston, Tex., a corporation of Texas
Filed June 14, 1963, Ser. No. 287,845
9 Claims. (Cl. 340—7)

My present invention relates to the art of continuous marine seismic surveying, that type of geophysical exploration in which a seismic impulse source is transported along the surface of a marine body and produces seismic impulses at intervals, the reflections of which from the marine bottom and sub-bottom strata are detected and recorded to produce a profile of the subsurface conditions.

Continuous profiling is a relatively recent development in the field of marine seismic exploration. It represents a valuable geophysical tool for several reasons, not the least of which is the speed with which it collects sub-bottom information. The technique involves movement of a relatively low energy source along the surface of the marine body at a substantially constant velocity, and initiation of a seismic impulse at timed intervals. The reflections from the impulses are detected by a hydrophone or group of hydrophones spaced from the source at or near the surface of the water, and moving at the same velocity. Such signals are amplified, filtered and otherwise processed to place them in proper form for recording on a visual record in which one scale is representative of time and the other is representative of distance from a reference point on the survey line.

In continuous marine seismic surveying, the seismic source may be a gas exploder utilizing ignition of a gaseous mixture in a confined chamber, an electrical spark discharge, or any other elastic wave generator capable of producing frequencies suitable for sub-bottom penetration and an energy level sufficient to achieve detectable reflections at or near the surface of the water.

It is apparent that in this type of exploration, as in conventional seismic work, the reflected events of interest as detected at the hydrophone always will be accompanied by random types of vibratory energy, commonly identified as noise. Thus, good record quality requires that the noise level be held to a minimum.

Heretofore, marine profiling in accordance with the foregoing general description has involved continuous movement both of the seismic source and of the hydrophone at which the reflections are detected. Thus, one of the sources of noise is the vibratory energy generated by the passage of the hydrophone through the water, for in a sensitive device of this type, it is impossible to eliminate random oscillation between the internal parts thereof when it is in motion.

As the vibrations produced by towing the hydrophone increase with the rate of movement, good record quality dictates a relatively slow operating speed. However, the contrary requirement for maximum coverage in a given operating period, coupled with other considerations, results in a normal operating speed on the order of three or four knots, or approximately seven feet per second.

In non-continuous marine exploration, a charge of dynamite commonly is employed as the seismic source, and the hydrophones are at rest at the time the charge is detonated. The advent of continuous profiling produced a system of instrumentation which was capable of detecting and recording useful information while the hydrophone was being towed through the water, such elements being essential to a method in which the rapid rate of repetition of seismic impulses, varying from fractions of a second up to a few seconds therebetween, precludes periodic stopping of the survey vessel to allow the hydrophones to come to rest. However, it is apparent that the noise level of the detected signals in continuous work is greater than that resulting from the non-continuous type, and my invention is directed to solution of this problem.

In view of the foregoing, one of the primary objects of my invention is to provide a method and apparatus for continuous marine seismic surveying which allows detection of all reflected signals at a hydrophone which is at or near a condition of rest in the water without sacrificing speed of operation.

It is a further object of my invention to provide a method and apparatus for continuous marine profiling in which two hydrophones or two groups of hydrophones are alternately and reciprocally advanced and retracted relative to the transporting vessel so that one always is at a condition of minimum movement in the water for improved detection of seismic reflections.

It is also an object of my invention to provide a method and apparatus for continuous marine profiling in which hydrophones or groups of hydrophones are secured to opposite ends of a towing line trailed behind the moving source, with means at the intermediate portion of the tow line to move it in opposite directions for relatively brief intervals of time so as to pull in one hydrophone and pay out the other during such intervals.

It is also an object of my invention to provide apparatus for continuous marine profiling including a seismic source, at least two groups of hydrophones and a timing recorder which repeatedly actuates the various elements of the assembly at selected intervals of time to allow one hydrophone or group of hydrophones to decelerate in the water, initiate a seismic impulse, and detect the reflections at the lagging hydrophone.

It is also an object of my invention to provide a system for continuous marine exploration including a pair of hydrophones adapted for towing through the water, driving means for the hydrophone towing lines to selectively and alternately accelerate one hydrophone and decelerate the other, and timing and recording means to control the operation of the system so as to initiate a seismic impulse at selected intervals of time and record the reflections therefrom detected by the hydrophone of lesser velocity.

In accordance with the foregoing objects, my invention encompasses methods and apparatus for towing two hydrophones or group of hydrophones along the surface of the marine body which overlies the area of interest, simultaneously pulling one of the hydrophones toward the towing vessel and paying out the other hydrophone away from the towing vessel at a rate on the order of that of the vessel, initiating a seismic impulse and detecting the bottom and sub-bottom reflections therefrom at the hydrophone which is retreating relative to the vessel, and reversing the directions of movement of the hydrophones and repeating the initiation of the seismic impulse at selected intervals of time.

The method and apparatus embodying my invention are described in detail subsequently herein, and illustrated in the attached drawings in which:

FIG. 1 is a perspective view of a vessel moving along a survey line and transporting the elements involved in the practice of my invention;

FIG. 2 shows the driving means which produces the periodic reciprocation of the hydrophones relative to the seismic source; and FIG. 3 is a block diagram illustrating the arrangement and interconnection of various elements which form a system suitable for practice of my invention.

In FIG. 1, reference numeral 10 indicates a marine survey vessel capable of transporting the seismic source and hydrophones through the water, and of carrying the apparatus necessary to generate a seismic impulse and record the reflections therefrom. The vessel ordinarily will be chosen in accordance with the conditions to be encountered in the area of exploration, and a relatively small vessel may be employed for inland waters if desired. The only requirements are seaworthiness and adequate space to accommodate the instrumentation.

The element which produces the seismic impulse may take any of several forms, as mentioned above, but I have chosen to illustrate a gas exploder unit indicated by reference numeral 11 which may be similar to that shown and described in the article appearing at p. 749, vol. XXIV of "Geophysics," entitled "Sub-Bottom Depth Recorder." FIG. 5 thereof illustrates a relatively simple combustion chamber which includes inlet lines for oxygen and propane, and an electrode which performs as a spark plug to initiate an explosive detonation of the oxygen-propane mixture at selected intervals of time.

The source 11 is towed behind the vessel 10, and the oxygen and propane lines and electrical connections thereto are designated generally by reference numeral 12. It should be noted that the source units for continuous marine surveying may be carried on the hydrophone towing vessel, suspended over the side, or towed therebehind. Further, although single vessel exploration is preferable for economic reasons, the principles of my invention could be employed as well where more than one boat is used.

A pair of hydrophones 13 and 14 are towed behind the vessel 10 by tow lines 15 and 16, which may be united to form one continuous line if desired. Under normal circumstances, the hydrophones will be at a distance of from 200 to 500 feet behind the towing vessel, depending on the survey conditions.

Although but two hydrophones are shown, it will be apparent that several hydrophones could be secured to the tow lines where conditions warrant, and for purposes of this description, it is to be assumed that the term "hydrophone" embraces one or a group of such elements connected as necessary for joint operation. Further, these instruments may be any of several different designs and may be actually on the surface of the water or submerged to some extent. Thus, the term "surface" herein shall include the normal operating depths for conventional hydrophones used in continuous marine surveying.

My invention involves paying out one of the hydrophones at a rate preferably on the order of that of the vessel and simultaneously advancing the other hydrophone at substantially the same rate. In FIG. 1, the hydrophone 13 is lagging well behind the hydrophone 14, and it may be assumed that this is the condition which will exist at one time during every cycle of operation. At a given moment, the towing lines 15 and 16 are set into motion so as to pull the hydrophone 13 toward the boat, and pay out hydrophone 14 at the same rate. The hydrophone 14 thus will come to a relatively quiet condition, by which is means a condition in which movement has ceased, or at least decreased sufficiently to reduce the random noise produced by its passage through the water to a minimal level.

After a brief interval of time for deceleration of hydrophone 14, a seismic impulse is initiated at the source 11. The elastic wave resulting from this impulse will travel downwardly to and through the marine bottom, and reflections will arrive at the hydrophone 14 in sequence. As the wave reaches its limit of effective penetration into the earth and returns to the surface of the water, the hydrophone will produce an analog signal representative of such reflections and communicate it to the recorder.

When all of the reflections of significance have arrived at the hydrophone 14, the direction of movement of the towing lines 15 and 16 will be reversed, so the hydrophone 13 will come to a quiet condition, and hydrophone 14 will be advanced toward the towing vessel 10. It should be noted that at the time this reversal of the direction of movement of the hydrophone towing lines is initiated, the relative positions of the hydrophones of FIG. 1 will have been reversed, i.e., hydrophone 13 will be substantially closer to the towing vessel than hydrophone 14.

After a brief interval during which hydrophone 13 becomes quiet, a second impulse will be initiated at the source, and the reflections will be detected at the lagging hydrophone as before. Continuing reversals of the direction of movement of the towing lines followed by periodic initiation of a seismic impulse and detection and recording of the reflections therefrom will produce a continuous profile of the bottom and sub-bottom conditions underlying the line traversed by the survey vessel 10.

FIG. 2 illustrates the driving means which I presently employ for maintaining accurate control of the direction and rate of movement of the towing lines. For simplicity, I presently prefer two identical units, identified by reference numerals 17 and 17a, which are interchangeable with each other. It is necessary only that they be properly connected to the timer-recorder, to be described hereinafter, to produce the proper results. In view of this identity, the same reference numerals are employed for each of the units 17 and 17a, except as noted herein.

An electrical motor 18 is in continuous, unidirectional operation during the time the unit is in use. It drives a shaft 19 to which are secured a driving gear 20 and a driving chain sprocket 21. The driving gear 20 is connected to a driven gear 22 mounted on the shaft 23 parallel to shaft 19. The chain sprocket 21 is connected by chain 24 to the large sprocket 25 mounted on the shaft 26 which is coaxial with shaft 23.

Between shafts 23 and 26, and joined thereto by clutches 27 and 28, is the shaft 29 to which is secured the tow line driving wheel 30, identified by reference numeral 30a on unit 17a. The tow lines 15 and 16 pass over the driving wheels 30 and 30a, or between a pair of wheels if such is desirable for effecting a frictional driving relationship therebetween.

The rotation of the driving wheel 30 results from the engagement of its shaft 29 with shaft 23 or 26 through clutch 27 or 28. These clutches are electrically actuated, and although such units may be either engaged or disengaged upon energization, it will be assumed for purposes of the subsequent description herein of the control sequence that they engage upon energization.

It has been pointed out that shaft 19 always rotates in one direction. The gear 20 will counterdrive the gear 22 so the shaft 23 will rotate in the direction opposite to that of shaft 19. Conversely, the sprocket chain arrangement rotates shaft 26 in the same direction as shaft 19. Thus, when the clutch 28 is engaged and clutch 27 disengaged, the tow line driving wheel 30 will rotate in the same direction as shaft 19, and when the condition of engagement of the clutches is reversed, the wheel 30 will rotate in the opposite direction.

As the various elements of this assembly are designed for minimum inertia, reversal of the direction of rotation of the wheel 30 is immediate for all practical purposes. In other words, it is never truly at rest, but always rotating in one direction or the other.

In FIG. 2, a pair of idler pulleys 31 are shown about which the tow lines 15 and 16 pass between the two driving assemblies. Although the lines are joined to form one continuous line by means of which the same intermediate portion passes through the driving units repeatedly, it will be apparent that the system would operate as well if each line was sufficiently long to allow a full range of travel of the hydrophone attached thereto, with a suitable storage space provided for the excess line when its hydrophone is near the vessel.

The tow lines 15 and 16 are solely for purposes of physically connecting the hydrophones to the vessel. Electrical connectors through which the signals generated by the hydrophones may be communicated to the recorder are indicated by reference numeral 32 in the case of hydrophone 13 and 33 in the case of hydrophone 14. These electrical connectors are secured to their respective tow lines in such manner as to never pass over the driving wheel 30 or 30a. This is to say that their points of separation from their associated tow lines are chosen to prevent their becoming entangled in the driving means.

FIG. 3 is a block diagram illustrating the operating relationship between the timing-recorder which controls the operation of the assembly, and the various elements thereof. Reference numeral 40 is the recorder unit which may take any of several forms. Such units are in common use in continuous marine surveying, and the details form no part of the present invention.

Associated with the recorder is the sequence timer 41 which also may take any of several forms well known in the art. For example, a number of cams may be mounted directly on the rotating shaft of the recorder to actuate micro-switches, or suitable electrical or electronic means may be employed to measure intervals of time and initiate the various steps described below.

The signal as detected by a hydrophone is communicated to the recorder through the line 42 which includes a filter 43, amplifier 44 and relay 45. The filter and amplifier perform the conventional operations necessary to ready the signal for direct printing by the recorder unit, and the relay 45 places in circuit either the line 32 connected to hydrophone 13 or the line 33 connected to hydrophone 14, as directed by the sequence timer 41 through the connecting line 46. Thus, the first function of the sequence timer is to connect the geophone which is at rest in the water to the recorder unit, and this is accomplished by alternating the position of relay 45.

The second function of the sequence timer is to initiate the seismic impulse at proper intervals. The source 11 is connected to the source trigger 50, which may be an electrical relay or similar switching device which will produce a spark within the gas explosion chamber at the proper times. The source trigger is connected to the sequence timer by line 51.

The third function of the sequence timer is to control the operation of the clutches 27 and 28. The clutch relay 60 is connected to the sequence timer by line 61, and to each of the electrical clutches on the driving assemblies by the lines 62, 63, 64 and 65, as shown in FIG. 2.

From FIG. 2, it will be noted that when the driving wheel 30 is moving the hydrophone towing line 15 inwardly toward the boat, the driving wheel 30a should be moving the line 16 away from the boat. Thus, assuming that the motors 18 rotate in the same direction, the clutch relay will energize relay connections 62 and 65 in tandem, and relay lines 63 and 64 in tandem. It should be noted that as the towing lines always are moving in one direction or the other, the clutch relay 60 need have but two positions, in one of which connections 62 and 65 are energized, and in the other of which connections 63 and 64 are energized.

It shoud be noted that the clutches can be readily controlled in other ways. For example, the clutches of driving unit 17a could be connected to those of driving unit 17 to create a master-slave relationship in which the former respond to the latter as directed by a clutch relay connected only to the master unit. Other modifications will be equally apparent to one familiar with control devices.

The timing of the above described events may vary with the characteristics of the survey being performed, but I have found the following operation to be generally satisfactory for a gas exploder. Initially, say at time 0, the driving means 17 and 17a are energized so as to move hydrophone 13 toward the boat and pay out the line to hydrophone 14. A period of three seconds will allow hydrophone 14 to come to a quiet condition in the water, and at time 0+3, the impulse is initiated at the source 11. The signal from hydrophone 14 is recorded until the reflections from the deepest horizon within the range of effective penetration of the seismic impulse have arrived. Normally a period of three seconds is ample, so at time 0+6, the driving units 17 and 17a are reversed in operation by the sequence timer. The tow lines then move in opposite directions for like three second periods of preparation and recording to complete one twelve second cycle.

As conventional geophysical amplifiers provide automatic gain control, I have found that it is desirable to place the lagging hydrophone in circuit through relay 45 as it is coming to rest between time 0 and 0+3, and time 0+6 and 0+9. Thus relay 45 is actuated to accomplish this step at the same time that clutch relay 60 is actuated to reverse the driving means, which is at six second intervals. Source trigger 50 is actuated at time 0+3 and 0+9, which also is at six second intervals.

In the recording unit employed for continuous marine seismic surveying, the horizontal scale commonly is calibrated in terms of elapsed time following the moment of effective generation of the seismic impulse. Thus, the impulse is initiated when the recording element is at an index position near one end of its path of travel, after which it moves across the horizontal scale of the recording medium at such rate as to complete one traverse during the three second recording period. As conventional recorders may be varied in speed of operation, control of the timer through the recorder shaft is quite convenient.

During the three second period that the lagging hydrophone is coming to rest in the water, the recorder is not receiving information of interest. Thus, my presently preferred embodiment includes means within the sequence timer to arrest operation of the recorder for three second intervals at three second intervals. In other words, the timer arrests operation of the recorder at the same moment that the direction of movement of the hydrophones is reversed and the lagging hydrophone is placed in circuit, which is time 0 and time 0+6. For three seconds thereafter, the signal from the circuit hydrophone is communicated to the amplifier 44 but is not recorded. At times 0+3 and 0+9, the timer actuates source trigger 50 and sets the recorder into motion. After a three second recording period, the recorder again stops to await a new signal from the timer.

The precise timing control resulting from the described arrangement establishes uniform measuring conditions. If the towing vessel continues to move forward at a uniform velocity, the resulting record will be an accurate reflection of the submarine profile, for the hydrophone in circuit always will be in substantially the same position relative to the source at the time it begins to receive reflections.

There is an incidental benefit resulting from the practice of my invention which is worthy of mention. When the hydrophone is towed through the water at the same velocity as the source, it will be apparent that during the period that reflections are being received at the hydrophone, there will be some movement of the hydrophone relative to the point at which the impulse was generated. In other words, the geometrical relationship between the point of generation of the impulse, the subsurface horizon from which reflections are received and the hydrophone at which such reflections are received will change. This condition, or an analogous condition, occurs in conventional seismic work where a single impulse is reflected to a number of spaced geophones occupying different positions relative thereto. The time variations resulting from the different paths of travel of successively arriving reflections create a lack of phase alignment in the resulting records of the several geophones, and the condition is described as normal moveout. Through use of my invention, there is no moveout, for the hydrophone receiving the reflections remains in the same position relative to the source throughout the recording period, and each hydrophone is at substantially the same distance from the source at the time the impulse is generated.

Many obvious variations in my invention will occur to one skilled in the art. For example, although it has been described here in conjunction with a direct recorder in which the resulting data is displayed in usable form, a magnetic tape can be used in conjunction with my invention, and suitable arrangements can be made for the marking of the times at which the various events involved in my sequence of operations take place. It is my intention to protect by Letters Patent all such changes and modifications as fall within the scope of the following claims.

I claim:
1. In continuous marine surveying, the method comprising
   (a) towing a pair of hydrophones behind a vessel moving along the surface of the water overlying the area of interest,
   (b) simultaneously pulling one of the hydrophones toward the vessel and paying out the other hydrophone to allow it to approach a condition of rest in the water,
   (c) initiating a seismic impulse from a moving source located at a distance from the hydrophone at rest and detecting the reflections therefrom at such hydrophone, and
   (d) reversing the directions of movement of the hydrophones relative to the vessel at timed intervals and repeating step (c) after each reversal.

2. In continuous marine surveying, the method comprising
   (a) towing behind a moving vessel a hydrophone towing line having hydrophones secured at opposite ends thereof so as to trail the vessel at a substantial distance,
   (b) moving the towing line in one direction at a rate not substantially less than that of the vessel whereby one hydrophone advances and the other hydrophone retreats relative thereto,
   (c) initiating a seismic impulse near the vessel and detecting the reflections therefrom at the retreating hydrophone, and
   (d) reversing the direction of movement of the towing line at timed intervals and repeating step (c) during each such interval.

3. In continuous marine seismic surveying, the method comprising
   (a) moving along the surface of the marine body overlying the area to be explored, a survey vessel transporting a seismic source and towing a pair of hydrophones therebehind,
   (b) simultaneously taking in one of the hydrophone towing lines and paying out the other hydrophone towing line at a rate on the order of that of the velocity of the vessel,
   (c) initiating a seismic impulse at the source and detecting the bottom and sub-bottom reflections therefrom at the hydrophone being paid out, and
   (d) periodically reversing the directions of movement of the hydrophones and repeating step (c).

4. In continuous marine seismic surveying, the method comprising
   (a) transporting a seismic impulse source and a pair of hydrophones spaced therefrom at a substantially constant velocity along the surface of the marine body overlying the area to be explored.
   (b) imparting a forward motion to one hydrophone and a rearward motion to the other hydrophone relative to the source for a measured interval of time whereby, for such interval, one hydrophone is advancing toward and the other hydrophone is retreating from the source,
   (c) during the measured interval of time, initiating a seismic impulse at the seismic impulse source and detecting the bottom and sub-bottom reflections therefrom at the retreating hydrophone, and
   (d) continuously reversing the motions of the hydrophones relative to the source at identical measured intervals of time, while repeating step (c) during each such interval.

5. In continuous marine seismic surveying, the method comprising
   (a) transporting a seismic source and a hydrophone towing line having hydrophones secured at the opposite ends thereof along the surface of the marine body overlying the area of interest whereby the hydrophones trail the source at a substantial distance,
   (b) moving the hydrophone towing line in one direction at a velocity on the order of that of the source whereby one hydrophone advances and the other hydrophone retreats relative to the source,
   (c) initiating a seismic impulse at the source and detecting the bottom and sub-bottom reflections therefrom at the retreating hydrophone, and
   (d) reversing the direction of movement of the hydrophone towing line and repeating step (c) at selected intervals of time.

6. In continuous marine seismic surveying, the method comprising
   (a) moving a seismic source at a substantially constant velocity along the surface of the marine body overlying the area to be explored,
   (b) towing a pair of hydrophones along the surface at a spaced distance behind the source,
   (c) simultaneously increasing the velocity of movement of one hydrophone and decreasing the velocity of movement of the other hydrophone by substantially equal amounts whereby one is advancing and the other is retreating relative to the source,
   (d) initiating a seismic impulse at the source and detecting the bottom and sub-bottom reflections therefrom at the retreating hydrophone, and
   (e) simultaneously decreasing the velocity of the advancing hydrophone and increasing the velocity of the retreating hydrophone by substantially equal amounts on the order of the velocity of the source and repeating step (d) at selected intervals of time.

7. In continuous marine seismic exploration, the method comprising
   (a) securing a pair of hydrophones to hydrophone towing lines and trailing the hydrophones behind a survey vessel moving at a substantially constant velocity on the surface of the marine body overlying the area to be explored,
   (b) imparting a forward motion to one towing line and a rearward motion to the other towing line at substantially the same rate with vessel carried driving means,
   (c) after a first measured interval of time following the initiation of relative movement between the vessel and the hydrophones, generating a seismic impulse and detecting the bottom and sub-bottom reflections therefrom at the retreating hydrophone,
   (d) after a second measured interval of time, reversing the motions of the hydrophone towing lines and repeating step (c), and
   (e) repeating step (d) at selected intervals of time.

8. In marine seismic exploration, the system comprising
   (a) a seismic source adapted for continuous movement along the surface of the marine body overlying the area to be explored,
   (b) a pair of towing lines, each line having at least one hydrophone attached thereto,
   (c) reversible driving means in operative engagement with each of the hydrophone towing lines to selectively and alternately pull in one line and pay out the other, (d) timer-recorder means electrically connected to said source, said hydrophones and said driving means, and adapted at selected intervals of time to reverse said driving means and record the signal from the hydrophone being payed out, and to actuate said source for the generation of a seismic impulse during said selected interval of time.

9. In marine seismic exploration, the system comprising (a) a seismic source adapted for continuous movement along the surface of the marine body overlying the area of interest,
(b) a recorder unit,
(c) a pair of towing lines, each line having at least one hydrophone attached thereto,
(d) reversible driving means in operative engagement with each of the hydrophone towing lines to selectively and alternately pull in one line and pay out the other,
(e) timing means operated by said recorder and connected to said source, said hydrophones and said driving means to periodically reverse said driving means and connect the hydrophone being payed out to said recorder at selected intervals of time, and actuate said source for generation of a seismic impulse during said selected interval of time.

References Cited by the Examiner
UNITED STATES PATENTS

| | | | |
|---|---|---|---|
| 2,907,416 | 10/1959 | Comba et al. | 189—26 |
| 2,994,397 | 8/1961 | Huckabay | 181—.5 |

BENJAMIN A. BORCHELT, *Primary Examiner.*

P. A. SHANLEY, *Assistant Examiner.*